United States Patent
Fasen (10) Patent No.: US 8,654,473 B2
(45) Date of Patent: Feb. 18, 2014

(54) TAPE HEAD LENGTH ADJUSTMENT

(75) Inventor: Donald J Fasen, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 101 days.

(21) Appl. No.: 13/348,802

(22) Filed: Jan. 12, 2012

(65) Prior Publication Data

US 2013/0182346 A1    Jul. 18, 2013

(51) Int. Cl.
*G11B 5/02*    (2006.01)

(52) U.S. Cl.
USPC .............. 360/55; 360/59; 360/77.12; 360/90

(58) Field of Classification Search
None
See application file for complete search history.

(56) References Cited

U.S. PATENT DOCUMENTS

| | | |
|---|---|---|
| 5,959,801 A | 9/1999 | Gillis et al. |
| 6,563,659 B1 | 5/2003 | Fasen |
| 7,586,710 B2 | 9/2009 | Partee et al. |
| 8,081,398 B2 * | 12/2011 | Hachisuka ............... 360/125.31 |

* cited by examiner

*Primary Examiner* — Muhammad N Edun

(57) ABSTRACT

A tape drive is disclosed. The tape drive determines a current tape width and adjusts the length of a tape head to more closely match the current tape width. The tape drive adjusts the length of the tape head by controlling the power to a heating element coupled to the tape head.

20 Claims, 7 Drawing Sheets

TAPE HEAD LENGTH ADJUSTMENT

BACKGROUND

Tape drives store date onto tapes. Typically tape drives store multiple tracks of data across the width of the tape simultaneously. The spacing between the read/write elements on the tape heads is closely controlled. The tape drive typically uses the same tape heads to read and write the data from the tape. When the width of the tape changes, the spacing of the data tracks across the width of the tape also change. When the spacing between data tracks change, the data tracks on the tape may no longer be aligned to the read/write elements on the tape head. If the position of the tape head is adjusted to align to one track of data on the tape, other tracks may no longer be aligned and may not be able to be read simultaneously.

The width of the tape may change due to a number of different factors. Changes in temperature cause changes in the width and in the length of the tape. Increases in temperature cause increases in both the width and length of the tape. Changes in humidity also cause changes in the length and width of the tape, with an increase in humidity acting to increase both the width and length of the tape. Changes in tension also affect the width and length of the tape. Increases in tension cause the tape to lengthen, but cause the width to decrease.

Tape drives are typically used in controlled environments (i.e. temperature and humidity control). Tapes are generally removable from the tape drive and therefore may be stored outside of a controlled environment or transported outside of a controlled environment. For example, a tape may be shipped to a data center and put into the tape drive as soon as the tape arrives. If the data center is located in a northern area during the winter, the tape may be cold and dry when it is inserted into the tape drive. If the data center is located in a southern area during the summer, the tape may be hot and wet when it is inserted into the tape drive. The difference between a cold tape and a hot tape may be 100 degrees F. or more. The difference between a dry tape and a wet tape may be as much as 80% relative humidity.

BRIEF DESCRIPTION OF THE DRAWINGS

FIGS. 5-6 provide a block diagram illustrating a servo system including the servo elements of FIG. 2, for maintaining the position of the head relative to desired tracks and bands of the magnetic recording medium, and for maintaining the speed of travel of the magnetic recording medium relative to the head.

DETAILED DESCRIPTION

FIGS. 1-9, and the following description depict specific examples of the invention. For the purpose of teaching inventive principles, some conventional aspects have been simplified or omitted. Those skilled in the art will appreciate variations from these examples that fall within the scope of the invention. The features described below can be combined in various ways to form multiple variations of the invention. As a result, the invention is not limited to the specific examples described below, but only by the claims and their equivalents.

In one example embodiment of the invention, a tape drive will determine the current width of a tape. The tape head will have a heating element coupled to the tape head. By heating or cooling the tape head with the heating element the tape head length can be adjusted to more closely match the current tape width.

Figure 1:
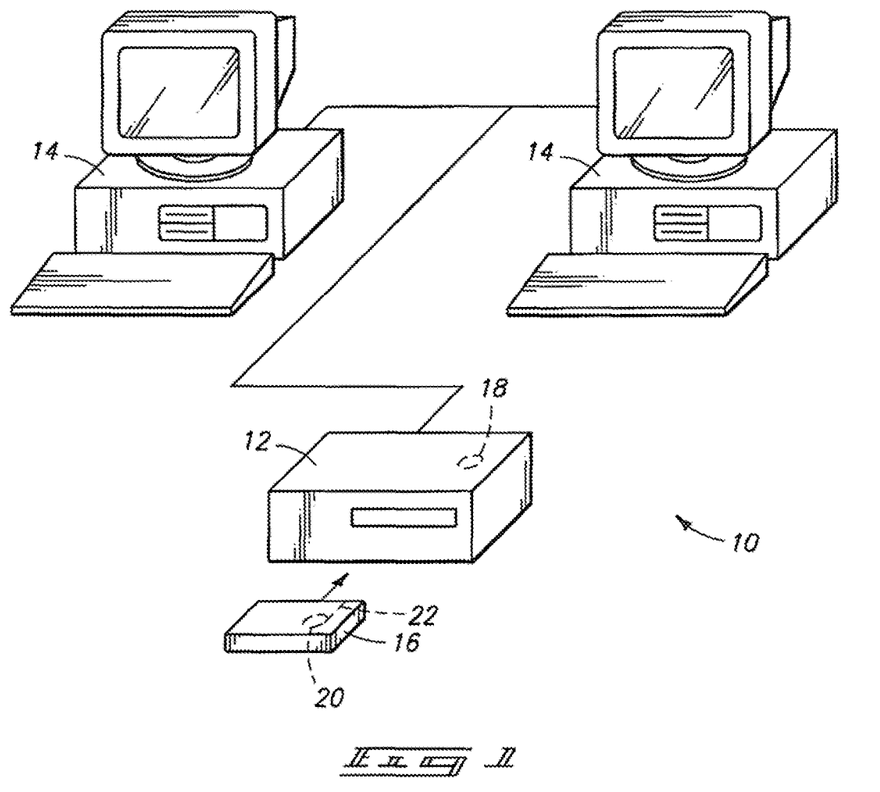
FIG. 1 is a perspective view of a computer network embodying the invention and including a magnetic recording tape drive.

FIG. 1 shows a computer network 10 including a data storage device or system 12 embodying the invention, and including one or more computers 14. The data storage device 12 reads data from and writes data to magnetic storage media. In one embodiment, the data storage device 12 is a stand alone tape drive. In another embodiment, the data storage device 12 is supported in a bay inside a housing of a computer 14 which forms a part of the network 10, in the illustrated embodiment, the data storage device 12 is a linear recording tape drive.

The tape drive 12 is used with tape cartridges 16, in one embodiment of the invention. In an alternative embodiment of the invention, the tape drive 12 is a reel to reel tape drive of the type that supports open reels. In the illustrated embodiment, the tape cartridge 16 is a single reel type tape cartridge, and includes a reel 20, and tape 22 wound on the reel 20. A second reel 18 is included in the tape drive 12 and engages the tape 22. In an alternative embodiment, the tape cartridge 16 includes two reels. While other widths can be employed, in the illustrated embodiment, the tape 22 has a width W of one half inch. The tape 22 also has a length in a direction perpendicular to the width W of the tape. A plurality of parallel tracks 24A, 24B, 24C, 24D, 24E, 24F, 24G, 24H, 24I, 24J, 24K, 24L, 24M, 24N, 24O, and 24P (24A-P) are defined across the width of the tape 22. The tracks 24A-P extend in the direction of the length of the tape 22.

Figure 2:
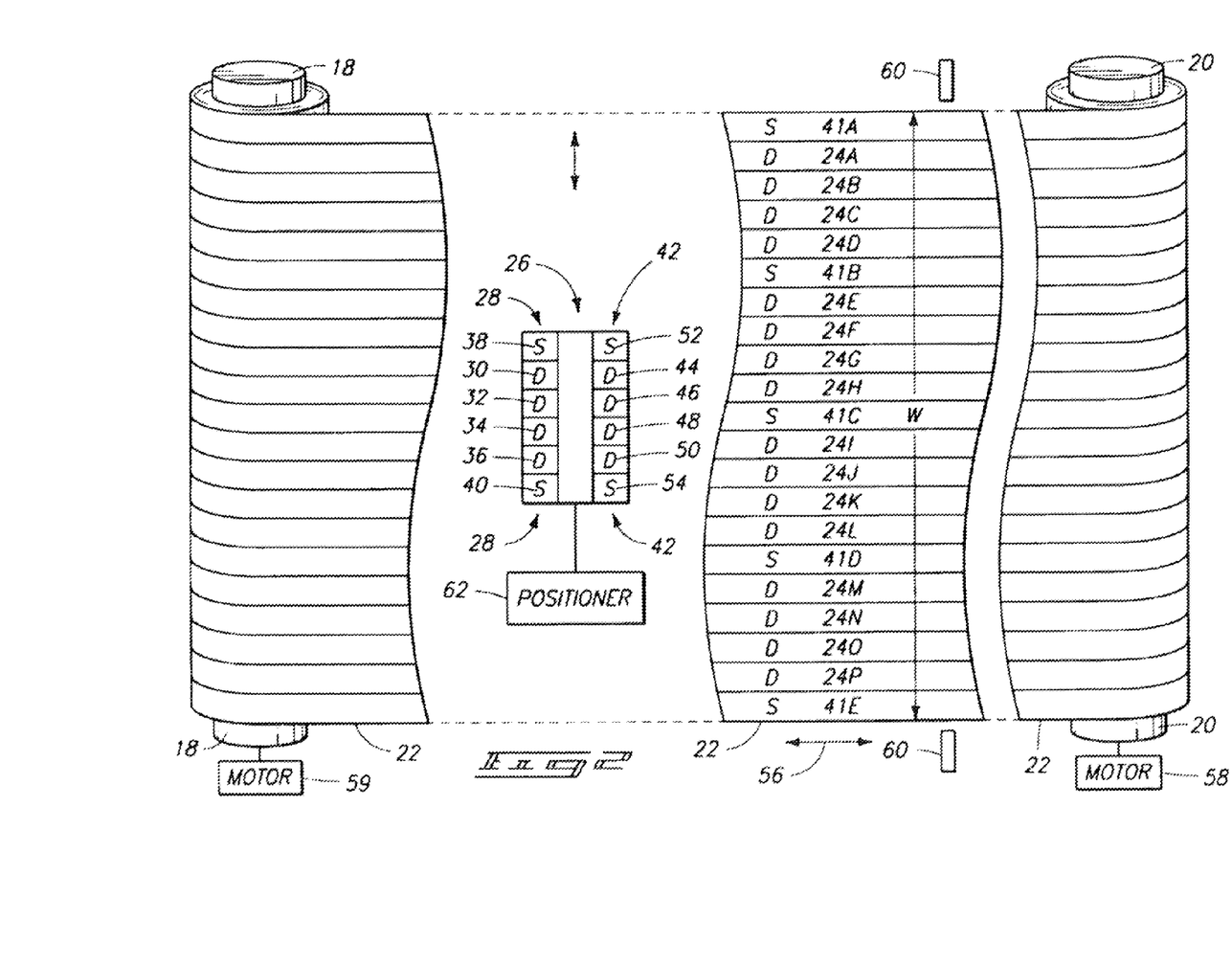
FIG. 2 is a diagrammatical perspective view illustrating an arrangement of servo elements and read/write elements on a head in the tape drive, and illustrating an arrangement of data tracks and servo bands on a tape on which the head operates.

The tape drive 12 includes a tape head 26 having a first bump 28 including a plurality of read/write elements 30, 32, 34, and 36 for reading data from or writing data to the tape in the parallel tracks 24, and a plurality of servo elements 38, and 40 for reading servo code from the tape in parallel bands 41A, 41B, 41C, 41D, and 41E different from the data tracks 24. In the illustrated embodiment, the servo code is pre-written to the parallel bands 41A, 41B, 41C, 41D, and 41E by another servo writer that may or may not be included in the tape drive 12. In another embodiment, the servo elements 38 and 40 are used for writing servo code to the parallel bands.

In FIG. 2, four sets of parallel data tracks are shown. However, various numbers of sets of data tracks can be employed. For example, in one embodiment, there are thirteen sets of data tracks, and an appropriate number of servo bands (e.g., with each of the thirteen sets of data tracks being located between two servo bands). Other numbers of sets can also be employed, for example 8 or 16 data tracks.

In the illustrated embodiment, the first bump 28 has four read/write elements, and two servo elements; however, in alternative embodiments, different numbers of read/write elements, or additional servo elements can be employed. In the illustrated embodiment, a "bump" is an area on the head having a column of (read/write and/or servo) elements. It is called a "bump" because it typically protrudes relative to the rest of the head. However, in the following disclosure and claims, the term "bump" is not to be construed so as to necessarily require protrusion relative to the rest of the head.

In FIG. 2, the read/write elements and servo elements are arranged with the four read/write elements 30, 32, 34, and 36, between the two servo elements 38 and 40. In the illustrated embodiment, the servo elements 38 and 40 are respectively of a physical construction identical to the physical construction of the read/write elements 30, 32, 34, and 36.

The tape head further has a second bump 42 including a plurality read/write elements 44, 46, 48, and 50 for reading data from or writing data to the tape in the parallel tracks 24, and two servo elements 52 and 54 for reading servo code from the tape in parallel bands. In the illustrated embodiment, the servo code is pre-written to the parallel bands 41A, 41B, 41C, 41D, and 41E by another servo writer that may or may not be included in the tape drive 12. In another embodiment, the servo elements 52 and 54 are used for writing servo code to the parallel bands.

In the illustrated embodiment, the second bump 42 has four read/write elements, and two servo elements; however, in alternative embodiments, different numbers of read/write elements, or additional servo elements can be employed.

The read/write elements 44, 46, 48, and 50, and servo elements 52 and 54 of the second bump 42 are arranged with the four read/write elements 44, 46, 48, and 50 of the second bump 42 between the two servo elements 52 and 54 of the second bump 42. The servo elements 52 and 54 of the second bump are respectively of a physical construction identical to the physical construction of one of the read/write elements 44, 46, 48, and 50.

The tape drive 12 is configured to drive the length of the tape 22 in either of a first and second direction relative to the head 26, as indicated by arrow 56. More particularly, the tape drive 12 includes at least one motor 58 which moves the tape 22 relative to the head 26. For example, in the illustrated embodiment, one motor 58 drives one of the reels 18 or 20, and another motor 59 drives the other of the reels 18 or 20. In an alternative embodiment, a capstan is used to drive the tape. The tape drive 12 may include conventional components such as tapes guides 60.

The servo and read/write elements of the second bump 42 are respectively parallel to the servo and read/write elements of the first bump 28, as shown in FIG. 2. In one embodiment, when the tape is traveling in the first direction (e.g., to the right in FIG. 2) and it is desired to write to the tape, the servo element 52 of the second bump 42 reads servo code from the servo band 41B on the tape to produce a servo signal, the read/write element 30 of the first bump 28 writes data to the track 24E, the read/write element 44 of the second bump 42 reads data from the track 24E, the read/write element 32 of the first bump 28 writes data to the track 24F, the read/write element 46 of the second bump 42 reads data from the track 24F, the read/write element 34 of the first bump 28 writes data to the track 24G, the read/write element 48 of the second bump 42 reads data from the track 24G, the read/write element 36 of the first bump 28 writes data to the track 24H, the read/write element 50 of the second bump 42 reads data from the track 24H, and the servo element 54 of the second bump 42 reads servo code from the servo band 41C to produce a servo signal.

When the tape is traveling in the second direction (e.g., to the left in FIG. 2) and it is desired to write to the tape, the servo element 38 of the first bump 28 reads servo code from the servo band 41B on the tape to produce a servo signal, the read/write element 30 of the first bump 28 reads data from the track 24E, the read/write element 44 of the second bump 42 writes data to the track 24E, the read/write element 32 of the first bump 28 reads data from the track 24F, the read/write element 46 of the second bump 42 writes data to the track 24F, the read/write element 34 of the first bump 28 reads data from the track 24G, the read/write element 48 of the second bump 42 writes data to the track 24G, the read/write element 36 of the first bump 28 reads data from the track 24H, the read/write element 50 of the second bump 42 writes data to the track 24H, and the servo element 40 of the first bump 28 reads servo code from the servo band 41C to produce a servo signal.

Figure 3:
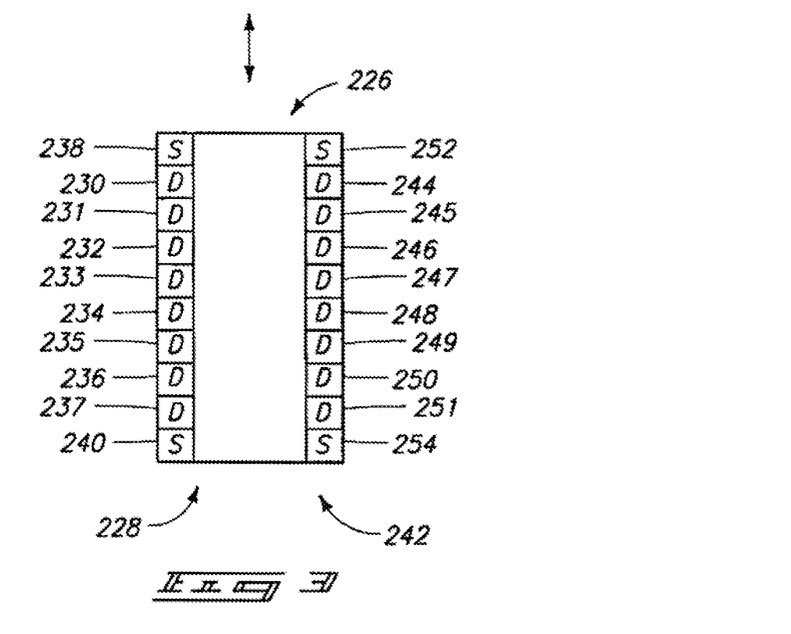
FIG. 3 is a diagrammatical perspective view illustrating an arrangement of servo elements and read/write elements on a head in accordance with an alternative embodiment of the invention.

FIG. 3 shows a head 226 in accordance with an alternative embodiment of the invention, wherein each of two bumps 228 and 242 includes eight read/write elements and two servo elements. More particularly, the first bump 228 of the head 226 includes servo elements 238 and 240, and read/write elements 230, 231, 232, 233, 234, 235, 236, and 237 between the servo elements 238 and 240, and the second bump 242 of the head 226 includes servo elements 252 and 254, and read/write elements 244, 245, 246, 247, 248, 249, 250 and 251 between the servo elements 252 and 254. The head 226 operates on a tape having, of course, eight data tracks between each pair of servo bands.

By employing two servo elements for reading from two servo bands, defects in the tape can be tolerated. Because the servo elements bracket the read/write elements, tape defects of maximum widths can be tolerated. Hone servo band on the tape is corrupted, the other servo band is used.

Figure 4:
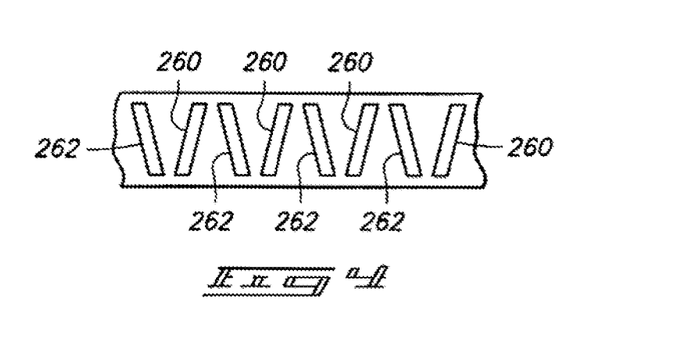
FIG. 4 is a diagrammatical plan view illustrating one possible servo band configuration that could be included in the magnetic recording medium shown in FIG. 2.

FIG. 4 illustrates a servo band configuration that could be employed in one embodiment of the invention for a servo band 41A, 41B, 41C, or 41D. This servo band configuration is a servo band configuration which provides both an indication of position (and speed) in the direction of travel of the tape, and an indication of lateral position of the tape relative to the servo element reading the servo band. The tape drive 12 includes a timing based demodulation scheme for sensing the servo information on the tape. The position of the head 26 relative to the tape width is derived from the relative timing of azimuthally sloped transitions 260 and 262. The servo code thus includes two elements: 260, which are written with a forward slope or positive azimuth angle, and transitions 262, which are written at a backward slope or negative azimuth angle and may or may not be symmetrical with respect to the transition 260. The time difference between read back pulses generated using a servo element is used to indicate the servo element's position in a servo band. By using a high resolution timing measurement, a high resolution position measurement is achieved. See European Patent Application EP 0690442 A2 for detailed information regarding servo systems that could be employed in the tape drive 12. Thus, the pattern is written with one frequency on one side of the band, and another frequency on the other side of the band.

The tape drive 12 further includes a positioner 62 which is mechanically coupled to the head and positions or moves the head in the direction of the width of the head to move the head between various positions for reading or writing to different tracks. For example, in a first position, the servo element 38 is positioned to operate on the servo band 41A and the servo element 40 is positioned to operate on the servo band 41B; in a second position, the servo element 38 is positioned to operate on the servo band 41B and the servo element 40 is positioned to operate on the servo band 41C; and in a third position, the servo element 38 is positioned to operate on the servo band 41C and the servo element 40 is positioned to operate on the servo band 41D. This leads into a discussion of but one advantage of the invention. The illustrated arrangement of servo elements and data elements on the head makes for efficient use of available space on the tape for servo bands. Servo bands are spaced on the tape to match the distance between the servo elements on the head. It is thus possible to share bands between one data track set and the adjacent data track set. This tape configuration has no more servo overhead than would a system that used only a single servo element per bump, except for one extra servo band at one of the edges of the tape.

The positioner 62 also moves the head in the direction of the width of the tape to make minute corrections to ensure that the read/write elements are accurately positioned over desired tracks during reading or writing operations. In the illustrated embodiment, the positioner 62 comprises a voice coil motor; however, any other head positioner known in the art can be employed.

Figure 5:
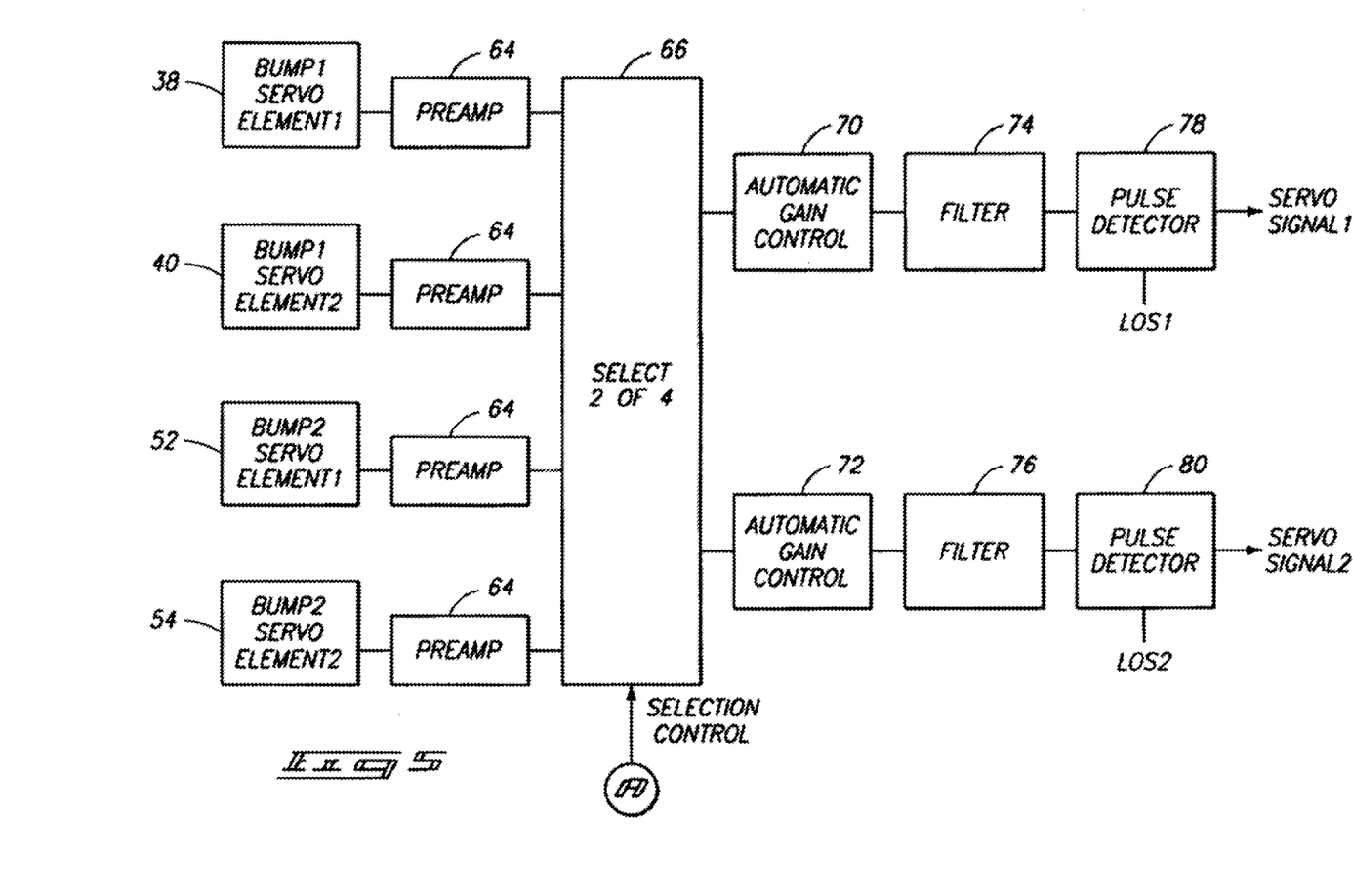

As shown in FIGS. 5-6, the tape drive 12 includes preamps 64 respectively coupled to the servo elements 38, 40, 52, and 54, and amplifying servo signals read by the servo elements which are reading servo code. This will be either the elements 38 and 40, or the elements 52 and 54, depending on the direction of tape travel, as described above. More particularly, the tape drive 12 includes a selection or switching circuit 66, coupled to the preamps 64, and enabling or using the preamps associated with the servo elements which are reading the servo code.

The tape drive 12 further includes a servo processor 68 which sends a selection control signal to the circuit 66 to select the appropriate pair of preamps depending on the direction of tape travel.

The tape drive 12 further includes automatic gain control circuits 70 and 72 respectively coupled to the preamps associated with the servo elements which are reading the servo code. The tape drive 12 also includes filters 74 and 76 respectively coupled to the automatic gain control circuits 70 and 72 to filter the signals produced by the automatic gain control circuits. In the illustrated embodiment, the filters 74 and 76 are band pass filters, and are used to remove noise. The tape drive 12 further includes first and second pulse detectors 78 and 80 respectively coupled to the filters 74 and 76. The pulse detectors produce servo signals, "SERVO SIGNAL1" and "SERVO SIGNAL2." The pulse detectors also determine if either of the servo bands is corrupted. If so, the pulse detector associated with the servo element reading the corrupted servo band produces a signal LOS1 or LOS2 signifying there is a loss of signal. This loss of signal information is passed to the servo processor so it can determine whether to use the signal produced by one servo element or another. In one embodiment, if neither servo band is corrupted, servo information from both of the servo elements that are reading servo code is used, and is combined mathematically (e.g., averaged in one embodiment).

The tape drive 12 further includes timing demodulators 82 and 84 which receive timing signals "SERVO SIGNAL1" and "SERVO SIGNAL2" produced by the pulse detectors. The timing demodulators 82 and 84 produce respective position error signals PES1 and PES2 which are passed to the servo processor 68. The tape drive 12 further includes a relative timing measure circuit 86 coupled to the timing demodulators 82 and 84, and which determines the difference in timing error signals produced by the timing demodulators 82 and 84. This Delta Time signal is also passed to the servo processor 68. The servo processor 68 uses the signals from the timing demodulator 82, the timing demodulator 84, and the relative time measure circuit 86 to accurately position the head 26 over the tracks from which the read/write elements are reading or to which the read/write elements are writing. More particularly, the tape drive 12 includes a digital to analog converter 88 coupled to the servo processor and providing an analog signal. The tape drive 12 further includes a power amplifier 90 coupled to the digital to analog converter 88 and amplifying the analog output of the digital to analog converter to a value sufficient to drive the positioner 62. More particularly, in the illustrated embodiment, the power amplifier 90 is coupled to the voice coil motor. In one embodiment, the tape drive adjusts the position of the head based on the average of PES1 and PES2.

The tape drive 12 further includes a selection circuit or switching circuit 92 controlled by the servo processor 68. The circuit 92 is coupled to the pulse detectors 78 and 80, and the servo processor selects the appropriate pulse detector output by monitoring the LOS1 and LOS2 signals and determining whether and which servo signal has been lost. The tape drive 12 further includes a phase locked loop 94 coupled to the circuit 92. The phase locked loop provides a tape speed clock which is used as a clock to write data to the tape. The tape speed clock can also be used in maintaining the speed of tape travel or can be used as a read reference clock.

Tape drive 12 may also include a controller for reading and writing data to the tape. Controller may comprise a processor, an application specific integrated circuit (ASIC), memory, and the like. Controller may also control the tension in the tape. In other embodiments a separate tape tensioning system, independent from the controller, may be included inside tape drive 12. In one embodiment, tension in the tape is controlled by a differential toque between the motor 58 coupled to one reel and the motor 59 coupled to the other reel.

The tape tension is controlled by accurately controlling the toque in each motor (58 and 59) and adjusting for the amount of tape on each reel, the drag across the tape head, the tape thickness and the like. In other embodiments the tension in the tape may be controlled using a spring loaded or a servo driven capstan. Both types of tape tensioning systems may be used with or without a tension sensor.

Figure 7:
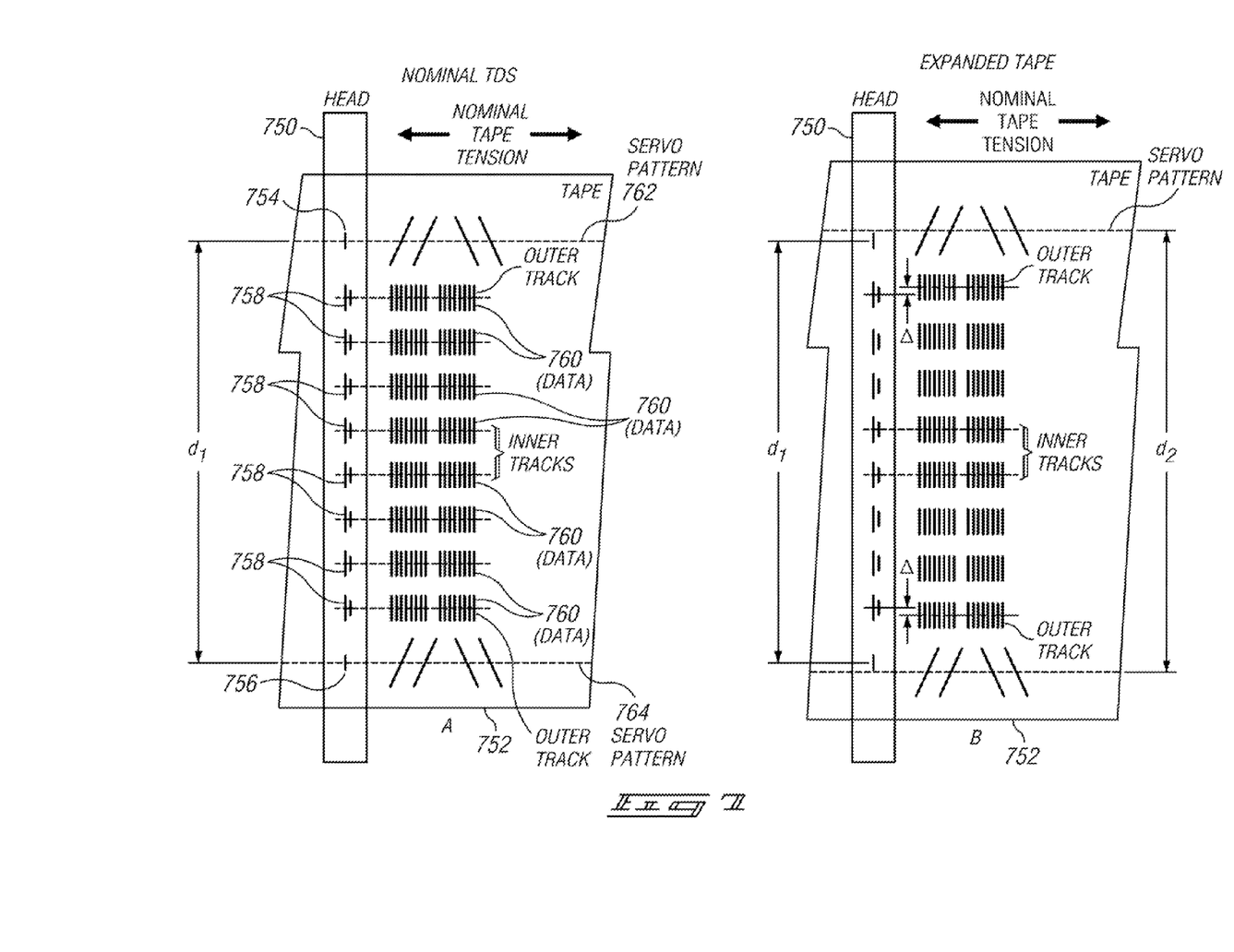
FIG. 7A shows a simplified layout of a tape head for reading and writing data to a tape in an example embodiment of the invention.
FIG. 7B is the same tape system as shown in FIG. 7A except that tape 752 is shown as expanded.

FIG. 7A shows a simplified layout of a tape head for reading and writing data to a tape in an example embodiment of the invention. FIG. 7 comprises head 750 and tape 752. Head 750 has an upper servo element 754 and a lower servo element 756 to read upper and lower servo patterns (762 and 764), respectively, from tape 752. Head has eight data elements for reading and writing data onto tape 752 spaced between the upper and lower servo elements (754 and 756). The two data tracks adjacent to the servo patterns are outer data tracks and the data tracks in the middle of the two servo patterns are the inner data tracks. The servo system of the tape drive keeps the head centered between the two servo patterns.

Tape 752 is shown at a nominal size under nominal tension in FIG. 7A. Therefore the servo elements on head 750 are centered in the upper and lower servo bands, respectively. The distance D1 between the center of the upper servo band and the center of the lower servo band equals the distance D1 between the two servo elements (754 and 756) on head 750. Tape has a plurality of data tracks 760 written onto tape 752. The data tracks were written to the tape when the tape was a nominal size with a nominal tension in the tape. Therefore the centers of all the data tracks 760 line up with the centers of the data elements 758 on head 750.

FIG. 7B is the same tape system as shown in FIG. 7A except that tape 752 is shown as expanded. Tape 752 in FIG. 7B is under the same nominal tension as in FIG. 7A, however the tape 752 is wider (and longer). The increase in tape width may be due to an increase in tape temperature, an increase in tape humidity, or both. In some example embodiments, the tape may have a thermal coefficient of expansion between 5 and 15 parts-per-million (PPM) change in length per degrees C. The tape may have a hydroscopic coefficient of expansion of between 3 to 12 ppm/% of relative humidity (RH). The change in size of the tape can be calculated for a given change in temperature or humidity. For example, when the hydroscopic coefficient of expansion is 10 ppm/% RH, and the RH changes by 10%, and the tape is 12650 μm wide, the tape width would change by 10 ppm*10%*12650 μm=1.2765 μm.

Because the tape 752 is wider and the head is the same size, the distance D2 between the center of the upper 762 and lower 764 servo bands is no longer equal to the distance D1 between the upper 754 and lower 756 servo elements. The servo bands are wide enough that the servo elements can accurately read the servo patterns and determine the center of the servo bands. Knowing the nominal size between the center of the two servo track (distance D1) and measuring the current distance between the two servo tracks (distance D2), the current tape width can be determined. In one example, the distance between the two servo bands is used as the tape width.

The data bands 760 are not as wide as the servo bands, and in some embodiments may be much narrower than the servo bands. The increase in size (width) of the tape has increased the spacing between the data tracks 760. Because the servo system keeps the head 750 centered between the two servo patterns, the misalignment between the inner data tracks and the inner data elements may be small. The misalignment between the outer data tracks and the outer data elements Δ may become large enough such that the outer data track may miss the data elements on the head. When this occurs the outer data track would not be readable. Even when the outer data track do not completely miss the outer data elements, the error rate reading the outer data track may increase. The misalignment of the inner data tracks to the inner data elements on the head may not be enough to increase the error rate of the inner data track.

The tape in both FIGS. 7A and 7B are under the same (nominal) tension. By keeping the tape at a constant tension, the change in the width of the tape will be due to a change in temperature of the tape or a change in humidity of the tape. In one embodiment, the tape head will have a heating element coupled to the tape head. By heating or cooling the tape head the tape head length can be adjusted to more closely match the current tape width.

Figure 8:
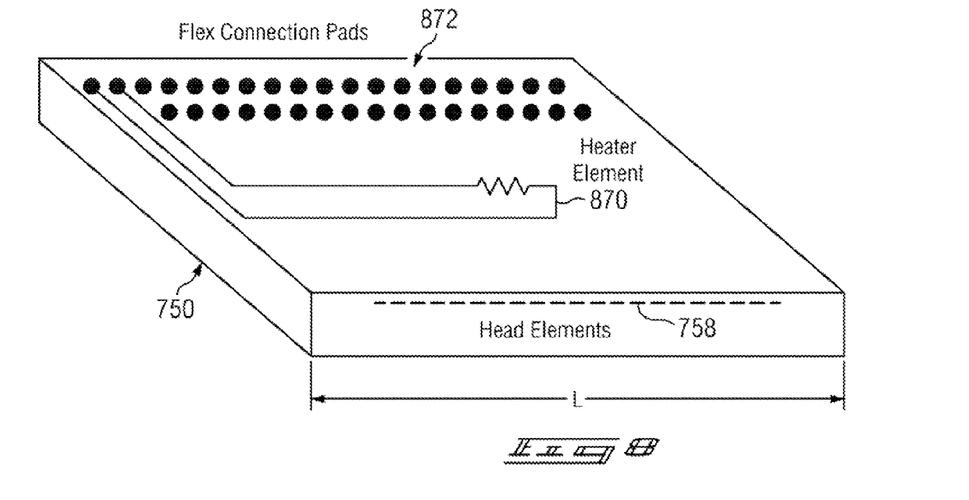
FIG. 8 is an isometric front view of a tape head 750 in an example embodiment of the invention.

FIG. 8 is an isometric front view of a tape head 750 in an example embodiment of the invention. Tape head 750 has a plurality of head elements 758 on the front face of tape head 750. Heater element 370 is coupled to or built into the tape head 750. Heater element 870 may be a resistive heating element or the like mounted on one side of tape head or preferably, built into the head using resistive traces similar to existing trace resistors. Heating element 870 is coupled to a power supply through flex connector pads 872 on the back side of tape head 750. A controller can adjust the tape head length L by adjusting the power to heater element 870. The controller can increase the length of the tape head by increasing power to heater element 870, thereby heating tape head 750. The controller can decrease the length of the tape head by decreasing power to heater element 870, thereby cooling tape head 750.

In one aspect of the invention, the tape drive 12 is designed for use with LTO format tapes. LTO or, Linear Tape-Open, is a format that defines, among other things, the number of servo bands, the spacing between the servo bands, and the servo code pattern. More information about LTO can be obtained from the assignee of the present invention or found on the Internet by searching for LTO. If the tape drive 12 is used with LTO tapes, the space between the upper and lower servo elements (e.g., 754 and 756) is 2859 μm. Supplying electrical power to the heating element will heat the die causing it to expand at a rate of approximately 10 ppm/DegC. There is a limit in the temperature change and maximum temperature that can be applied to the head element die due to negative effects these have on the magnetic properties thereby degrading the read/write performance of the head elements. A temperature change of 10 DegC is believed to be acceptable and would offer 10 ppm/DegC*10 DegC=100 ppm (parts-per-million) tape width correction.

By measuring the distance between the positions of the two servo bands, the current width of the tape can be determined. Compensating for the current width of the tape can be done by adjusting the length of the tape head. If the tape is wider than nominal, the length of the tape head can be increased. If the tape is narrower than nominal, the length of the tape head can be decreased. By increasing or decreasing the length of the tape head, the spacing between the data elements on the head can be adjusted such that all the data tracks will be aligned with the data elements on the head.

Figure 9:
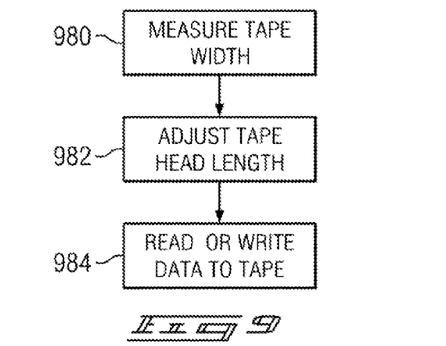
FIG. 9 is flow chart in an example embodiment of the invention.

In one example embodiment of the invention the length of the tape head is adjusted for both reads and writes. For this embodiment the power to the heater element can be set to a nominal power so that the length of the tape head is at a nominal length. The distance between the positions of the two servo bands can be measured at the nominal tape head length to determine the current width of the tape. The length of the tape head can then be adjusted to more closely match the measure tape width. The data can then be written or read from the tape. In some cases the tape width may have changed by a larger amount than the length of the tape head can be adjusted. In these cases the tape head length can be set to its maximum or minimum value before reading or writing the data from/to the tape. FIG. 9 is a flow chart in an example embodiment of the invention. At step 980 the tape width is measured. At step 982 the tape head length is adjusted by heating or cooling the tape head. At step 984 data is read from or written to the tape.

In other embodiments the tape head length may only be adjusted during reads. For this embodiment the power to the heater element can be set to a nominal power so that the length of the tape head is at a nominal length. The distance between the positions of the two servo bands can be measured at the nominal tape head length to determine the current width of the tape. The data will be written to the tape at the nominal tape head length and the current tape width will also be written to the tape and associated with the data. The current tape width can be associated with the date in a number of ways, for example writing the current tape width into the header for the data or other recoverable sections of the data.

When reading the data written with this method, the stored tape width is read from the tape. The length of the tape head can then be adjusted to more closely match the measure stored tape width when reading data. In some cases the tape width may have changed by a larger amount than the length of the tape head can be adjusted. In these cases the tape head length can be set to its maximum or minimum value before reading the data from the tape.

Some tapes may not have a current width associated with data written to the tape, for example legacy tapes. These tapes can still benefit from using this technique. In one embodiment, the data from a set of track is read using a nominal length of the tape head. The error rate between the inner and outer data track are compared. When the error rate of the outer data track is larger than the error rates of the inner data tracks by some threshold, it would indicate that the current tape head length does not match the current tape width. The length of the tape head can be adjusted by changing the power to the heating element. As the length of the tape head is changed, the error rates of the inner and outer tracks can be compared. When the difference between the error rates of the inner and outer tracks is minimized, the current tape head length will be a match for the tape width used when the data was written to the tape.

What is claimed is:

1. A tape drive, comprising:
   at least one tape head, the at least one tape head having a first and a second servo element to read a first and a second servo band on a tape;
   a servo processor to calculate a current tape width by determining a distance between the first and second servo bands; a heating element on the at least one tape head;
   a controller to write information to the tape and read information from the tape;
   the controller adjusting power to the heating element to adjust a length of the at least one tape head to compensate for the current tape width.

2. The tape drive of claim 1, wherein the controller applies a nominal power to the heating element while the first and the second servo elements read the first and the second servo bands on the tape.

3. The tape drive of claim 1, wherein the controller applies a nominal power to the heating element while data is written to the tape and the controller writes the current tape width to the tape when writing the data to the tape.

4. The tape drive of claim wherein the tape is in the LTO format.

5. The tape drive of claim 1, wherein data is read from or written to the tape once the tape head length has been adjusted.

6. The tape drive of claim 1, further comprising: a tape tensioning system to adjust a current tape tension to a nominal tension wherein data is written to, and read from, the tape using the nominal tension.

7. The tape drive of claim 1, wherein the controller cools the tape head by reducing the power to the heating element and heats the tape head by increasing the power to the heating element.

8. The tape drive of claim 1, wherein the length of the at least one tape head is in a direction parallel to the current tape width.

9. The tape drive of claim 1, wherein the length of the at least one tape head is between the first and the second servo element of the at least one tape head.

10. A method of writing data to a tape, comprising:
    measuring a current tape width;
    adjusting a length of a tape head by adjusting power to a heating element coupled to the tape head such that the length of the tape head more closely matches the current tape width;
    writing the data to the tape.

11. The method of claim 10, wherein the tape is in the LTO format.

12. The method of claim 10, wherein the current tape width is also written to the tape.

13. The method of claim 10, wherein the length of the tape head is adjusted to a nominal length by applying a nominal power to the heating element while the data is written to the tape and the current tape width is also written to the tape and associated with the data.

14. The method of claim 10, wherein the length of the tape head is measured between a first and a second servo element of the tape head, and the length of the tape head is in a direction parallel to the current tape width.

15. A method of reading data from a tape, comprising:
    measuring a current tape width;
    adjusting a length of a tape head by adjusting power to a heating element coupled to the tape head such that the length of the tape head more closely matches the current tape width;
    reading the data from the tape.

16. The method of claim 15, wherein the tape is in the LTO format.

17. The method of claim 15, wherein a nominal power is applied to the heating element while the current tape width is measured.

18. The method of claim 15, wherein a stored tape width is read from the tape and the length of the tape head is adjusted to more closely match the stored tape width before reading data from the tape.

19. The method of reading data from a tape of claim 18, comprising:
    reading data from the tape using a nominal power applied to the heating element when there is not a stored tape width on the tape;
    calculating a initial delta error rate between an error rate in at least one center data track and an error rate in at least one outer data track;
    when the initial delta error rate is above a threshold: changing the length of the tape head to a new tape head length by adjusting the power to the heating element;
    reading data from the tape using the new tape head length and calculating a new delta error rate between an error rate in at least one center data track and an error rate in at least one outer data track;
    optimizing the tape head width by reducing the new delta error rate to a minimum;
    reading the data from the tape using the optimized tape head length;
    when the initial delta error rate is not above a threshold: reading the data from the tape using the nominal power to the heating element.

20. The method of claim 15, wherein the length of the tape head is measured between a first and a second servo element of the tape head, and adjusting the length of a tape head changes a distance between the first and the second servo element of the tape head.

* * * * *

UNITED STATES PATENT AND TRADEMARK OFFICE
CERTIFICATE OF CORRECTION

| | | |
|---|---|---|
| PATENT NO. | : 8,654,473 B2 | |
| APPLICATION NO. | : 13/348802 | |
| DATED | : February 18, 2014 | |
| INVENTOR(S) | : Donald J Fasen | |

It is certified that error appears in the above-identified patent and that said Letters Patent is hereby corrected as shown below:

In the Claims:

In column 9, line 41, in Claim 4, delete "claim" and insert -- claim 1 --, therefor.

In column 10, line 32, in Claim 18, after "reading" insert -- the --.

Signed and Sealed this
Ninth Day of September, 2014

Michelle K. Lee
*Deputy Director of the United States Patent and Trademark Office*